Sept. 5, 1961 T. E. ARMANDROFF ET AL 2,999,190
SWITCHBOARD
Filed March 11, 1957
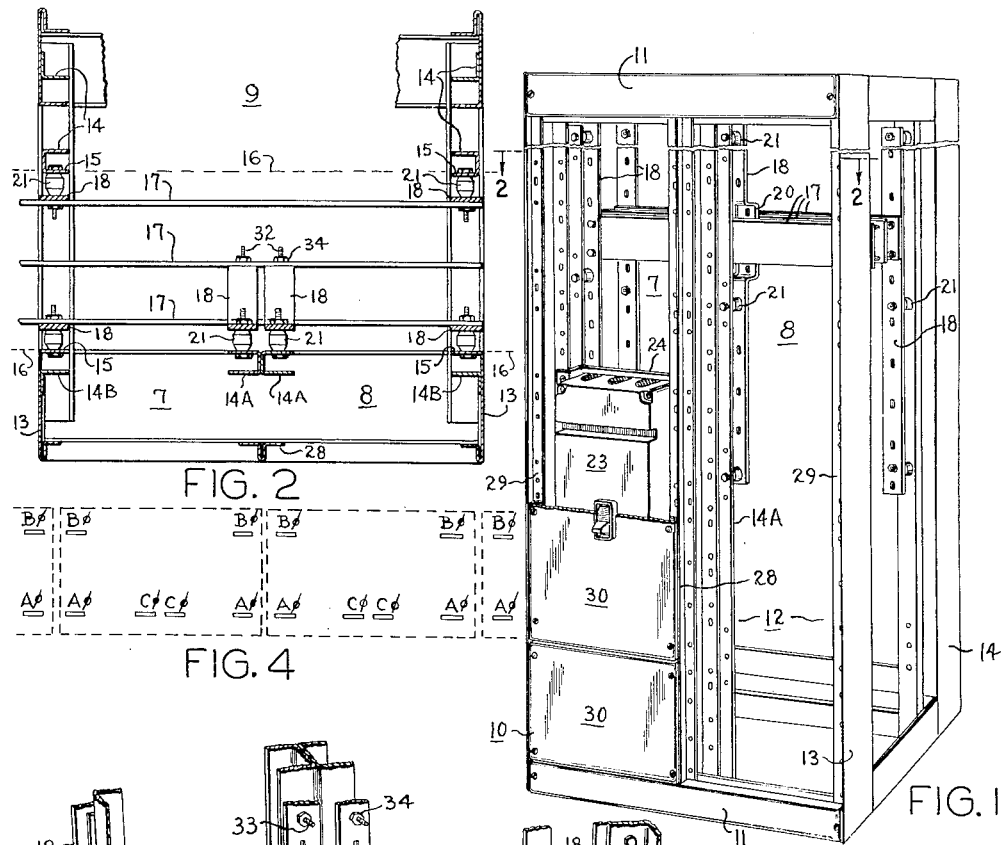
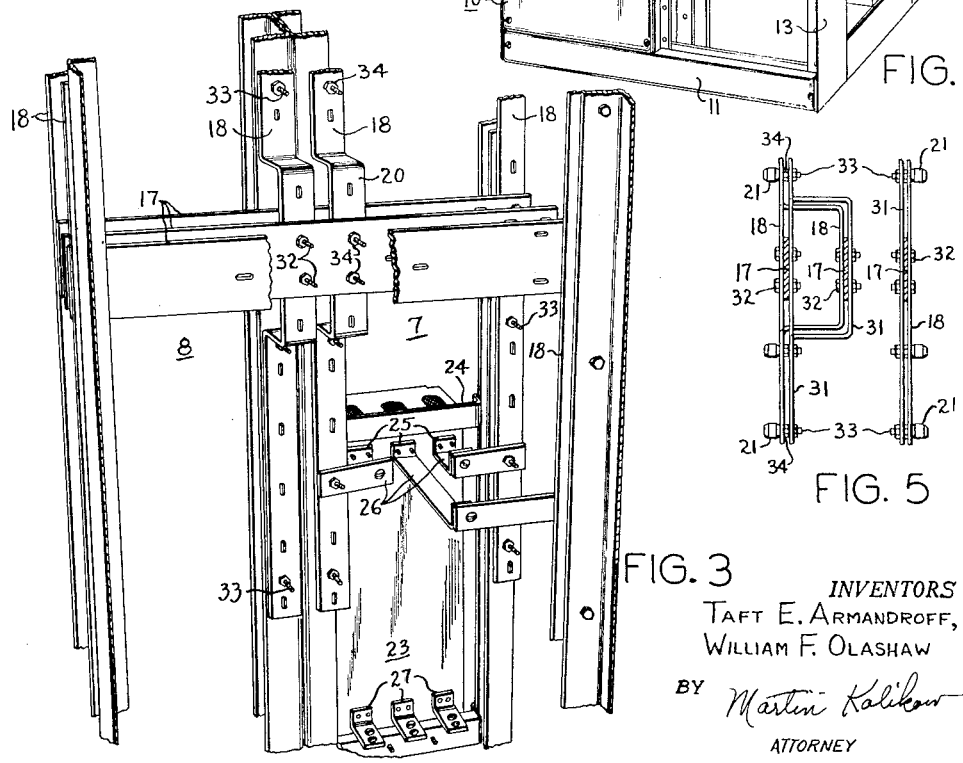
INVENTORS
TAFT E. ARMANDROFF,
WILLIAM F. OLASHAW
BY Martin Kalikow
ATTORNEY United States Patent Office 2,999,190
Patented Sept. 5, 1961

2,999,190
SWITCHBOARD
Taft Emerson Armandroff and William Francis Olashaw, New Britain, Conn., assignors to General Electric Company, a corporation of New York
Filed Mar. 11, 1957, Ser. No. 645,251
4 Claims. (Cl. 317—120)

Our invention relates to switchboards, and more particularly to enclosed switchboards for housing protective and control apparatus for electric power distributing circuits.

Switchboards, in general, are either specially engineered to accommodate a particular group of devices or pre-engineered with a sufficiently versatile construction to accommodate a great variety of devices. Such pre-engineered switchboards, however, have heretofore often sacrificed desirable features of economy, strength, size and wiring accessibility in order to achieve versatility of device accommodation and pleasing over-all appearance. For example, typical pre-engineered switchboards employ groups of parallel closely spaced bus bars, each group extending in a common plane directly behind one of several chambers in which the various circuit protective and control devices are mounted. This arrangement however results in high short circuit stresses, requires many offset connections between the main power supplying conductors and the bus bars of each group, and blocks the access to the load and line terminals of the devices from the rear of the switchboard.

Accordingly, an important general object of the invention is to provide a switchboard construction of the pre-engineered type having great versatility of device accommodation and pleasing over-all appearance without sacrifice in desirable electrical and mechanical characteristics or installation convenience.

Other objects of the invention include the provision of a switchboard construction having unusual short circuit strength, small over-all depth, direct accessibility from the rear to both line and load terminals of accommodated devices, and low manufacturing and assembly cost.

Another specific object of the invention is to provide a modular switchboard construction in which both the device accommodating capacity and the current carrying capacity can be increased without modification of the basic switchboard installation and with confidence that the short circuit tests and consequent ratings of the switchboard construction by the manufacturer will be applicable to the entire system.

In general, in accord with the invention, a supporting structure is provided for a row of electrical devices, and three branch bus bar conductors for three phase connection to the devices are arranged parallel to one another behind the structure on opposite sides of the region occupied by the row of devices thereby to provide direct access from the rear to the line and load terminals of the devices. The rear of the supporting structure also contains bus bar supporting surfaces in two spaced planes and the branch bus bar conductors are triangularly spaced and mechanically secured in insulated closely spaced relation with these supporting surfaces. Main bus bar conductors are preferably arranged perpendicular to these triangularly spaced branch bus bar conductors and are fastened in electrical contact therewith. By placing two such supporting structures for triangularly spaced bus bars alongside one another, a rectangular module is provided accommodating two rows of electrical devices all fed by the same main conductors with pairs of branch bus bar conductors of common phase alongside one another.

In accord with a further feature of the invention all of the main and branch bus bar conductors are arranged with their major surfaces extending in parallel planes thereby to facilitate connection to and between the various bus bars from the rear of the switchboard and also to reduce the over-all depth dimension of the switchboard. This uniform orientation of the bus bars also permits the current carrying capacity of the switchboard to be increased without modifying a basic previous installation by merely duplicating branch bus bar conductors aligned with the original branch bus bar conductors and connected electrically to opposite sides of the main bus bar conductors.

The novel features believed characteristic of the invention are set forth in the appended claims. The invention itself, however, together with further objects and advantages thereof may be easily understood by referring to the following description taken in connection with the accompanying drawing in which:

FIGURE 1 is a front perspective view of a switchboard construction embodying the invention;

FIGURE 2 is a top view of the switchboard construction of FIGURE 1 taken along line 2—2 of FIGURE 1 with the accommodated devices and front covers removed;

FIGURE 3 is a detail perspective view from the rear of the main and branch bus bar arrangement and construction of the switchboard construction of FIGURE 1;

FIGURE 4 is a schematic top view of the branch bus bar arrangement in a many-sectioned switchboard; and FIGURE 5 is a side view of a modification of the bus bar construction whereby the current carrying capacity of the switchboard may be increased.

Referring to FIGURE 1, the invention is shown embodied in the construction of a switchboard 10 having a supporting structure 11 including a plurality of vertically arranged supporting members indicated generally by the numeral 12. These supporting members 12 include metal supporting panels 13 at the sides of the switchboard 10, rear supporting rails and panels 14 behind panels 13 and device mounting rails 14A, 14B intermediate panels 13, as best seen in FIGURE 2. The side panels 13 and central mounting rails 14A define two elongated chambers 7 and 8 for accommodating two rows of electrical devices while the rear supporting rails 14 define a wiring chamber 9. These supporting members 12 also provide bus bar supporting surfaces 15 each lying in one of two spaced parallel planes, indicated in FIGURE 2 by dashed lines 16, located centrally of a horizontal cross section of the device. Three horizontally extending aligned parallel spaced main bus bar conductors 17 and six vertically extending parallel spaced branch bus bar conductors 18 are all arranged in the space between these two planes 16 and are all oriented with their major surfaces parallel to one another and to the spaced planes 16. They are preferably apertured at spaced points along their length for convenience in making connection thereto.

These six vertical branch bus bar conductors 18 are arranged in two groups of three triangularly spaced conductors each extending alongside a supporting surface 15 of one of the vertically arranged supporting members 12. Preferably, each such group of three vertical branch bus bar conductors are arranged along corners of a right triangle with two of the bus bars directly behind one of the side supporting panels 13 and the third bus bar conductor directly behind one of the central mounting rails 14A. With this arrangement the branch bus bar conductors 18 are not directly behind any of the electrical devices mounted within each of the two chambers 7 and 8 defined by the side panels 13 and the central mounting rails 14A. As best seen in FIGURE 3, these branch bus bar conductors 18 thus do not block direct access to the line or load terminals of such accommodated devices from the rear of the switchboard.

The two branch bus bar conductors located adjacent each side of the switchboard construction 10 and making up the four outer branch conductors 18 are respectively connected preferably without appreciable offset to the two outermost main bus bar conductors 17. The two internal or intermediate branch bus bar conductors 18, however, are connected by means of an offset bent portion 20 to the central main bus bar conductor 17. By virtue of this bus bar arrangement, the switchboard 10 constitutes a module or section such that two or more such switchboard sections may be arranged contiguously side-by-side with all of the branch bus bar conductors 18 in these additional sections connected to the same main conductors 17. In his arrangement, shown in FIGURE 4, the conductors in each pair of branch bus bar conductors 18 extending closely alongside one another are connected directly to the same main bus bar conductor 17 and therefore to the same phase as indicated of an alternating current source connected thereto.

In order to support and impart an unusually great short circuit strength to the bus bar conductors, each of the branch bus bar conductors 18 is mechanically secured in insulated closely spaced relation with a vertically arranged supporting member 12 of the supporting structure 11. In the construction shown in the drawing this is accomplished by using a plurality of insulated stud fasteners 21 for securing each branch bus bar conductor 18 to the supporting surface 15 of an adjacent vertical supporting member 12. While we have shown a plurality of insulated stud members it will be appreciated that any suitable insulated mounting means may be employed for this purpose.

As best shown in FIGURE 3, electrical devices such as a circuit breaker 23 are mounted within the two vertical chambers 7 and 8 by means of transverse mounting straps 24 secured to the breaker 23 and to the mounting rails 14A, 14B of the switchboard supporting structure 11. Connections to the line terminals 25 of breaker 23 from the branch bus bar conductors 18 are then made by means of suitable connector straps 26. The load terminals 27 of circuit breaker 23 are likewise directly accessible for connection thereto from the rear of the switchboard.

A central front vertical mounting rail 28 is also provided which cooperates with flanges 29 at the front of side panels 13 to support suitable front panels 30 of the switchboard. Suitable additional front and rear panels (not shown) may of course be provided for enclosing the front and rear of the switchboard construction. Suitable end panel sections may likewise be provided for enclosing the sides of the switchboard construction 10 where no additional sections are arranged alongside the switchboard construction 10.

Referring now to FIGURE 5, we have shown a modification of the switchboard construction of FIGURE 1 whereby the current carrying capacity of the branch bus bar conductors can be increased without alteration of the initial bus bar arrangement. In this construction an additional branch bus bar conductor 31 is arranged in flatwise facing alignment with each of the initial branch bus bar conductors 18 but is connected in electrical contact with an opposite major surface of the main bus bar conductor 17 from that to which the initial bus bar conductor 18 is connected. In making this connection the same bolts 32 may be used to fasten both of the branch bus bar conductors 18 and 31 to the same main conductors 17. The studs or bolts 33 used to fasten the branch bus bar conductors 18 to the insulated studs 21 may likewise be used to secure the additional branch bus bar conductors 31 mechanically and electrically to the original branch conductors 18. In this arrangement, the nuts 34 used to fasten conductors 18 to insulated studs 21 may conveniently serve as conducting spacers between conductors 18 and 31 and thus need not be removed.

It will thus be seen that we have provided a switchboard construction capable of meeting the objectives previously set forth. In general, the arrangement of all of the vertical supporting members and branch bus bar conductors in three parallel spaced rows provides unusually great electrical and mechanical strength as well as unusual accessibility to both the front and rear of accommodated devices. The triangular bus bar arrangement behind the sides defining each row of accommodated devices not only facilitates the direct mounting of the bus bars upon the supporting structure but also facilitates the connection between the vertical branch bus bar conductors and the horizontal main bus bar conductors with an offset portion in only one of these three triangularly spaced branch bus bar conductors. The greater spacing between these branch bus bar conductors by virtue of this triangular arrangement also reduces the electrical stresses between the bars under short circuit test. The parallel orientation of all of the bus bars reduces the over-all depth dimension of the switchboard construction and permits quick assembly of the structure since all of the fastening means to and between the various bus bars are oriented in the same plane and accessible from the rear of the switchboard. The arrangement of the bus bars also permits a modular construction whereby switchboard sections may be supported contiguously alongside one another to form a total bank of enclosed switchboards all fed from the same main bus bar conductors and with common phasing of adjacent pairs of branch bus bar conductors.

Although we have described above a specific embodiment of the invention many modifications may be made and it is intended by the appended claims to cover all such modifications as fall within the true spirit and scope of the invention.

What we claim as new and desire to secure by Letters Patent of the United States is:

1. A switchboard assembly comprising: a rectangular cabinet having its interior divided into front and rear rectangular chambers; means for mounting circuit controlling devices of equal width in side-by-side vertical rows in said front rectangular chamber; a plurality of vertically extending bus bars rigidly supported in said rear chamber, one at each rear corner, one at each front corner, and at least one at the front central portion of said rear chamber for supplying electrical power to said circuit-controlling devices, whereby free access is provided through said rear chamber between said vertically extending bus bars to the back surfaces of each row of circuit-controlling devices mounted in said front chamber; and a plurality of polyphase-connected main bus conductors extending into said rear chamber and connecting both of the vertical bus bars in the rear corners of said rear chamber to a first electrical phase, connecting both of the vertical bus bars in the front corners of said rear chamber to a second electrical phase, and connecting the vertical bus bar in the front central portion of said rear chamber to a third electrical phase.

2. A switchboard assembly comprising: a rectangular cabinet having its interior divided into front and rear rectangular chambers; means for mounting circuit controlling devices of equal width in side-by-side vertical rows in said front rectangular chamber; a plurality of vertically extending bus bars rigidly supported in said rear chamber, one at each rear corner, one at each front corner, and at least one at the front central portion of said rear chamber for supplying electrical power to said circuit-controlling devices, whereby free access is provided through said rear chamber between said vertically extending bus bars to the back surfaces of each row of circuit-controlling devices mounted in said front chamber; and three parallel polyphase-connected main bus bars extending through said rear chamber spaced-apart horizontally from front to rear, the rearmost of said main bus bars passing immediately adjacent both of said vertical bus bars in said rear corners and being supported in electrically conducting relationship thereon, the foremost of said main bus bars passing immediately adjacent both of said vertical bus bars in said front corners and being supported in electrically conducting relationship thereon, and the central of said main bus bars being supported in electrically conducting relationship on an offset portion of the vertical bus bar positioned in the front central portion of said rear chamber.

3. A switchboard assembly comprising: a rectangular cabinet having its interior divided into front and rear rectangular chambers; means for mounting circuit-controlling devices of equal width in side-by-side vertical rows in said front rectangular chamber; a rigid frame in said cabinet including vertically extending support members positioned at respective corners of said rear rectangular chamber, two of said support members being situated at the front corners of said rear chamber, two further of said support members being situated at the rear corners of said rear chamber, and said frame further including at least one additional vertically extending support member positioned at the front central portion of said rear chamber, whereby free access is provided through said rear chamber between said support members to back surfaces of each row of circuit-controlling devices mounted in said front chamber; a plurality of vertical bus bars each rigidly mounted in insulated relationship closely adjacent one of said support members for supplying electrical power to said circuit-controlling devices; three parallel polyphase-connected main bus bars extending through said rear chamber horizontally spaced-apart from front to rear, the rearmost of said main bus bars passing immediately adjacent the rearmost ones of said vertical corner bus bars and being supported in electrically conducting relationship thereon, the foremost of said main bus bars passing immediately adjacent the foremost ones of said vertical corner bus bars and being supported in electrically conducting relationship thereon, and the central one of said main bus bars being supported in electrically conducting relationship on an offset portion of the vertical bus bar positioned in the front central portion of said rear chamber.

4. A switchboard assembly comprising: a rectangular cabinet having its interior divided into front and rear rectangular chambers; means for mounting circuit-controlling devices of equal width in side-by-side vertical rows in said front rectangular chamber; a rigid frame in said cabinet having vertically extending supporting surfaces at the rear corners of said rear chamber at the front corners of said rear chamber and at the front central portion of said rear chamber; a plurality of vertical bus bars each rigidly mounted in insulated relationship closely adjacent a respective one of said support surfaces for supplying electrical power to said circuit-controlling devices; three parallel polyphase-connected main bus bars extending into said rear chamber and spaced-apart horizontally from front to rear, the rearmost of said main bus bars passing immediately adjacent the rearmost ones of said vertical corner bus bars and being supported in electrically conducting relationship thereon, the foremost of said main bus bars passing immediately adjacent the foremost ones of said vertical corner bus bars and being supported in electrically conducting relationship thereon, and the central one of said main bus bars being supported in electrically conducting relationship on an offset portion of the vertical bus bar positioned in the front central portion of said rear chamber.

References Cited in the file of this patent

UNITED STATES PATENTS

| | | |
|---|---|---|
| 285,267 | How | Sept. 18, 1883 |
| 1,192,447 | Nielsen | July 25, 1916 |
| 1,405,133 | Horton | Jan. 31, 1922 |
| 1,902,501 | Hill | Mar. 21, 1933 |
| 2,026,884 | Glasgow | Jan. 7, 1936 |
| 2,037,026 | Hubbel | Apr. 14, 1936 |
| 2,181,664 | Melzer | Nov. 28, 1939 |
| 2,288,078 | Fisher | June 30, 1942 |
| 2,319,415 | Lightfoot | May 18, 1943 |
| 2,424,345 | West | July 22, 1945 |
| 2,441,485 | Graves | May 11, 1948 |
| 2,542,853 | Wills | Feb. 20, 1951 |
| 2,645,743 | De Smidt | July 14, 1953 |
| 2,719,251 | Stewart | Sept. 27, 1956 |